United States Patent [19]

Bell et al.

[11] Patent Number: 5,413,800
[45] Date of Patent: May 9, 1995

[54] PROCESS FOR THE PREPARATION OF A FOOD PRODUCT

[75] Inventors: James Bell, Milton Keynes; Robert D. Jones, Bedford, both of United Kingdom; Hans Graber, Hamburg; Klaus B. Vollinger, Weissensburg-Rehlings, both of Germany

[73] Assignee: Unilever Patent Holdings B.V., Vlaardingen, Netherlands

[21] Appl. No.: 149,821

[22] Filed: Nov. 10, 1993

[30] Foreign Application Priority Data

Nov. 11, 1992 [EP] European Pat. Off. ............ 92310283
Nov. 11, 1992 [EP] European Pat. Off. ............ 92310284

[51] Int. Cl.⁶ .......................... A23L 1/00; H05B 6/00
[52] U.S. Cl. .................................. 426/241; 426/305; 426/307
[58] Field of Search ............... 426/241, 243, 305, 307; 219/411

[56] References Cited

U.S. PATENT DOCUMENTS

| | | | |
|---|---|---|---|
| 4,575,616 | 3/1986 | Bergendal | 219/411 |
| 4,716,820 | 1/1988 | Stuck | 99/443 C |
| 4,749,579 | 6/1988 | Haydock et al. | 426/242 |
| 4,800,090 | 1/1989 | August | 426/243 |

FOREIGN PATENT DOCUMENTS

| | | |
|---|---|---|
| 0019916 | 12/1980 | European Pat. Off. . |
| 2354741 | 1/1978 | France . |
| 3234154 | 3/1984 | Germany . |
| 3721412 | 1/1989 | Germany . |
| 2206026 | 12/1988 | United Kingdom . |
| 457458 | 3/1975 | U.S.S.R. ............ 426/241 |
| 1711765 | 2/1992 | U.S.S.R. ............ 426/243 |
| 9112756 | 5/1991 | WIPO . |

*Primary Examiner*—George Yeung
*Attorney, Agent, or Firm*—Cushman Darby & Cushman

[57] ABSTRACT

A novel process for the preparation of food products comprising rapid total surface heating via high intensity short wave infra-red. A variety of food products can benefit from such a preparation, for example coated products, meat products and vegetables which are heat treated before packaging in order to seal the product and produce a crisp outer layer, those products are then further heated/cooked by the consumer before consumption.

11 Claims, 4 Drawing Sheets

PROCESS FOR THE PREPARATION OF A FOOD PRODUCT

FIELD OF THE INVENTION

The invention relates to a novel process for the preparation of food products comprising rapid total surface heating via high intensity short wave infra-red. The invention further relates to a process for the preparation of low fat food products having a heat-seared crisp outer surface.

BACKGROUND TO THE INVENTION & PRIOR ART

It is desirable to be able to selectively heat the outer surface of food products in order to for example heat-set coatings, heat-sear food products to provide an improved crisp outer surface or selectively thaw the outer-most surface of a frozen product.

Furthermore, it has been recognised for a long time that it is beneficial to reduce the fat content of food products. Conventionally certain food products, for example coated food products, potato chips, are pre-fryed in order to seal the coating and/or provide a crisp outer surface. Such a pre-frying process results in a higher quantity of fat/oil being absorbed by the food product than is required for producing the desired end result.

U.S. Pat. No. 4,800,090 (Musser's Potato Chips Inc) discloses a process and apparatus for preparing potato chips without the use of oil comprising subjecting the potato slices to standard infra-red having a maximum of 50 kW/m$^2$, followed by exposing the sliced potato pieces to a sufficient amount of standard infra-red to achieve browning. Such a process will not restrict the heat to the surface only and requires much greater exposure times to the heat source.

GB 2 206 026 (Havethill Meat Products Ltd) discloses the use of high intensity short wave infra-red to provide sausages with sear marks conventionally provided by cooking sausages on a charcoal grill. The heat source for such an application is necessarily highly focused and the utility of high intensity short wave infra-red for total surface heating is not disclosed.

DEFINITION OF THE INVENTION

Accordingly the invention provides a process for the rapid total surface heating of a food product comprising exposure of the food product to a high intensity, short wave infrared heat source.

DISCLOSURE OF THE INVENTION

Exposure of the food product to a high intensity, short wave infra-red heat source has the particular advantage that only the very outer surface of the food product is heated, allowing the process to have particular utility for the heat-setting of coatings or heat-searing of food products for example meat or vegetable products, or within processes which require the upper surface only of a frozen product to be thawed.

Preferably the infra-red heat source has a wavelength of from 0.8μm to 2.5μm; more preferably 1.1 to 1.6μm and an intensity of from 50 kW/m$^2$ to 1200 kW/m$^2$; more preferably from 100 kW/m$^2$ to 1000 kW/m$^2$ most preferably from 100 kW/m$^2$ to 500 kW/m$^2$.

Preferably the food product is exposed to the infra-red heat source for from 2 seconds to 100 seconds; more preferably from 5 seconds to 90 seconds and even more preferably from 10 seconds to 50 seconds.

The exact preferred intensity of the infra-red heat source and exposure time will vary within these limits depending on the food product being heat treated.

Additionally, the process preferably comprises exposure of the food product to air as well as the infra-red heat source. The air prevents local overheating which can be a problem with infra-red heating, and thus prevents burning of uneven edges. The air temperature is provided at a temperature of from 20° C. to 300°C.; more preferably 20° C. to 150°C.; most preferably the air is provided at ambient temperature. The preferred velocity of the air will be determined by the design of the nozzles from which air is supplied to the product. However the velocity of the air will generally be from 2 m/s to 20 m/s; more preferably 4 m/s to 10 m/s.

Similarly the preferred volumetric flow of the air will be determined by the number of nozzles from which air is supplied to the product. However the volume flow of the air will generally be from 2000 to 7100 liters/minute, most preferably 3500 to 4500 liters/minute for a process generating a maximum of 75 kg product/hour.

USE OF THE PROCESS

A variety of food products can benefit from heat treatment of their outer surface with a high intensity short wave infra-red heat source, for example, coated products, meat products and vegetables (such as potato chips) which are heat treated before packaging in order to seal the product and produce a crisp outer layer. Such products are then stored after packaging, preferably in the frozen state, prior to further heating/cooking by the consumer before consumption. Conventionally such products are pre-fried in fat/oil before packaging, thus increasing the fat content of the outer surface of the product. For example, the coating of a conventional fish finger will absorb approximately 6–7% oil during the pre-frying process. The process of the present invention enables the production of a heat-seared, crisp outer surface wherein the product need not be pre-fried and therefore the outer surface of the product has a desirable reduced fat content.

The outer surface of the food product may optionally be sprayed with 0.1 to 4% by weight of the food product oil either prior to or after the rapid heat treatment.

The oil may be applied to the surface of the food product either by brushing the surface with oil, spraying on the oil, or, if a coated food product is being manufactured, by the incorporation of the oil into the coating composition.

In particular the crumb on coated products and preferably coated fish, chicken and vegetable products can be set or sealed using the heat treatment process of the present invention.

However, the utility of the process of the present invention is not restricted to the products described above. The process has numerous other uses, for example melting cheese toppings on pizzas, providing a crisp outer coating to dough based products. The process can also be used within manufacturing process routes whereby only the very upper surface of a product needs to be heated, for example in order to thaw the surface of frozen fish blocks to enable complex fish products to be constructed, or for thawing the surface of ice-cream blocks to facilitate the coating of the ice cream with for example chocolate.

DESCRIPTION OF THE APPARATUS

Obviously the apparatus for preparation of products according to the invention will vary according to the food product being heat treated. However the apparatus for carrying out the invention will now be described with reference to the accompanying diagrammatic drawings in which.

Figure 1:
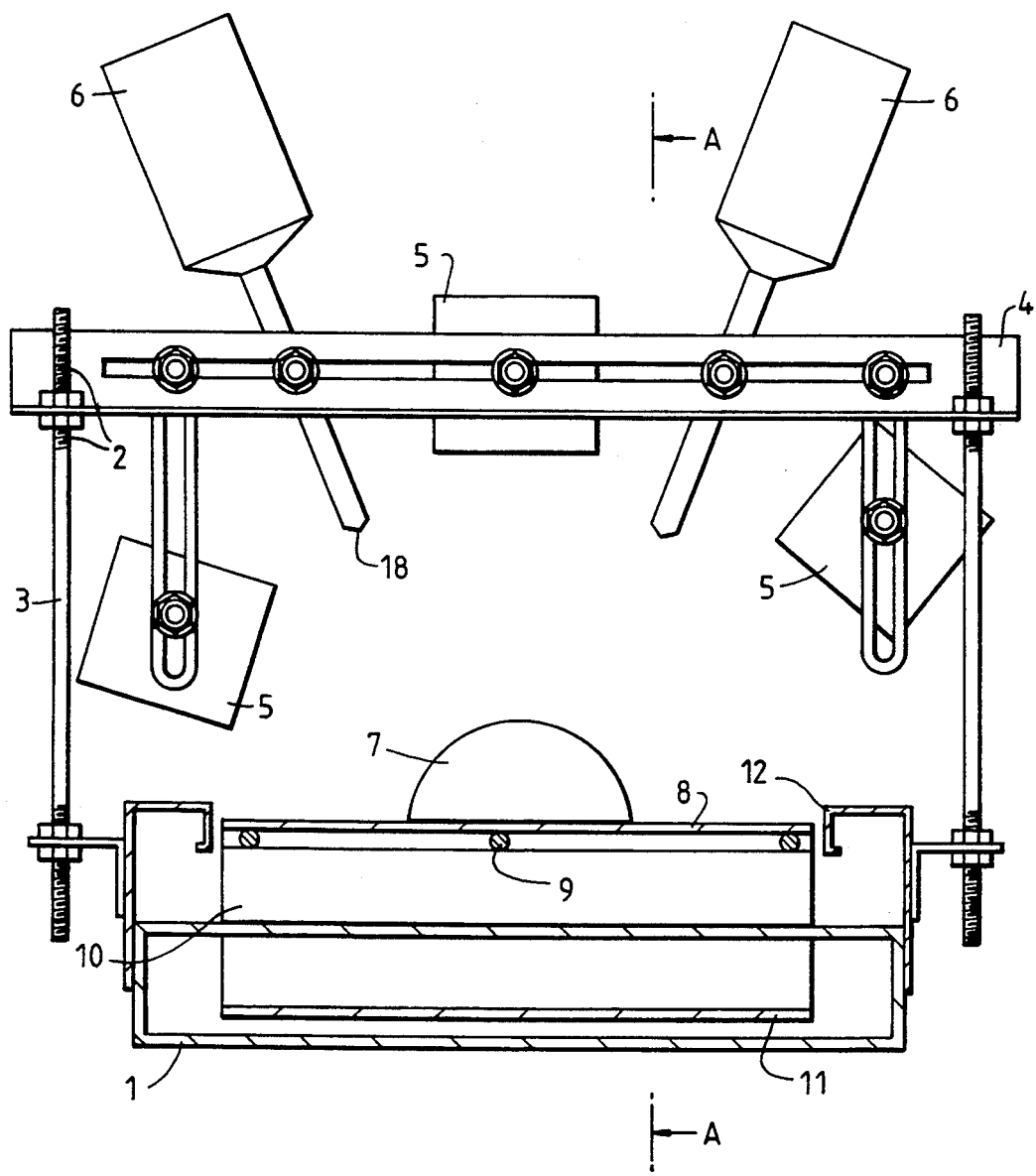
FIG. 1 is an end elevation, partly in section, showing one form of the apparatus.
Figure 2:
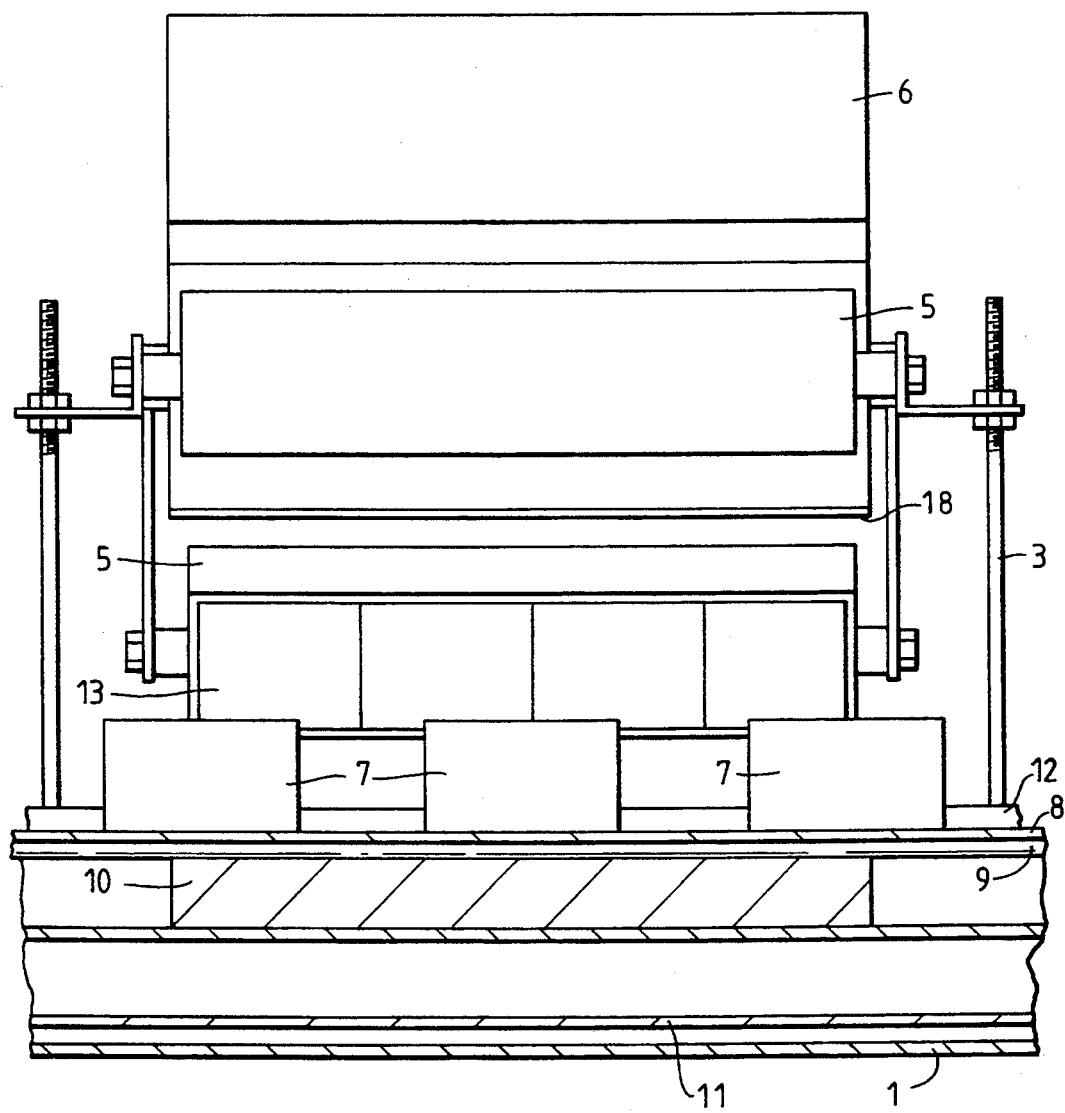
FIG. 2 is a sectional side elevation on the line A–A of the apparatus of FIG. 1.

Referring to FIGS. 1 and 2 the apparatus comprises a base (1) on which is mounted means (not shown) for driving a conveyor belt (8) over a plurality of support rods (9) extending in the direction of travel of the belt. The conveyor belt comprises a series of interlinking metal members leaving air spaces therethrough. Below the support rods (9) is a block of thermal absorbent material (10) which absorbs thermal energy passing through the conveyor belt. The return flight of the conveyor belt is indicated at (11). A rim (12) extends along each side of the upper flight of the conveyor belt.

Supported on the rim (12) is a framework (2) which comprises two upright supports (3) on each side of the conveyor belt (8) each pair of which carry a cross member (4) extending across the conveyor belt (8).

The height of the cross members (4) above the level of the conveyor (8) can be adjusted.

In a preferred embodiment of the invention, adjustably mounted on the cross members (4) are two elongated air nozzles (6) extending in the direction of travel of the conveyor (8) having outlet nozzles (18) directed towards the conveyor belt and adapted to be connected to a source of air (not shown).

Three elongated lamp housings (5) are also adjustably mounted on the cross members (4) and extend in the direction of travel of the conveyor belt (8) substantially over the length of the air nozzles (6). The lamp housings contain a source of infra-red heat conveniently in the form of a number of lamps preferably spaced between 5 to 20 cm apart. The housings preferably contain a reflector to direct the infra-red rays and enable the heat source to be directed towards the conveyor belt (8). The bulbs are protected by a heat resistant cover (13) as seen in FIG. 2.

The food (7) to be treated is carried through the apparatus on the conveyor belt (8) where it is subjected to the infra-red heat sources. In a preferred embodiment of the invention, air at the target temperature is directed onto the food by the nozzles (18).

Figure 3:
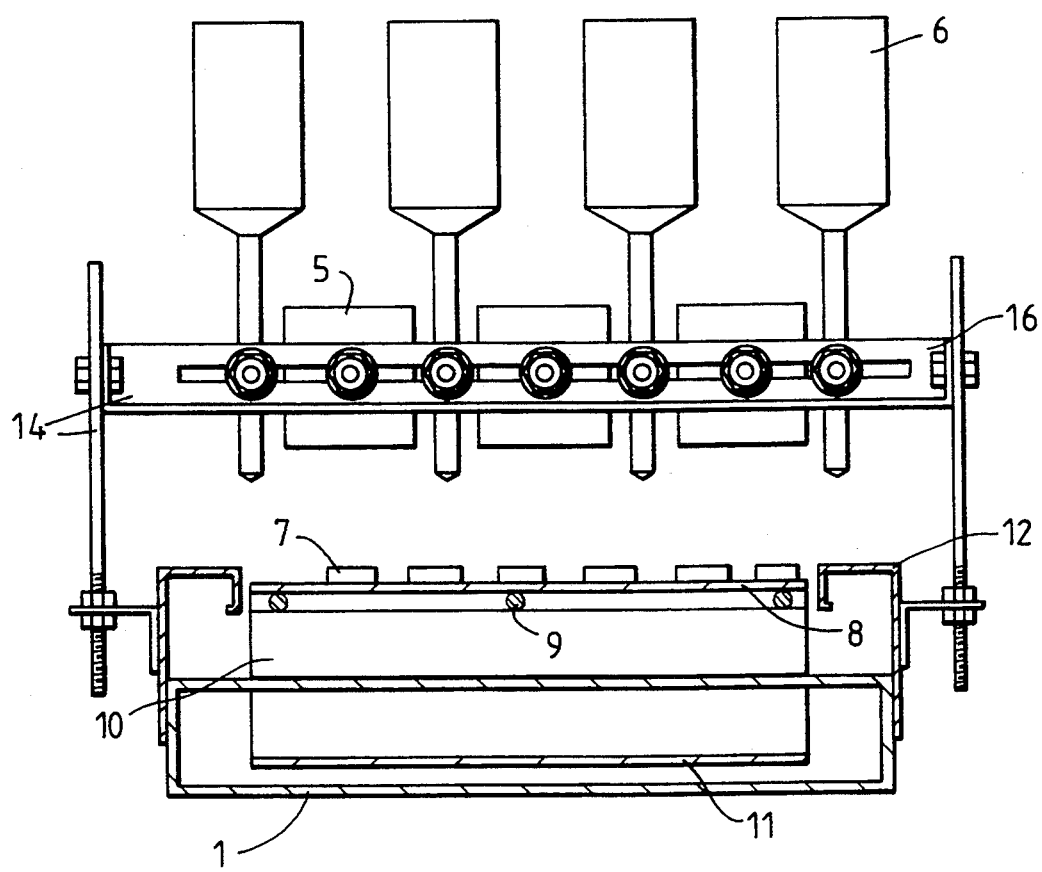
FIG. 3 is an end elevation similar to FIG. 1 showing an alternative form of apparatus.

The positions of both the lamps and nozzles can be adjusted to maximise their effect on the food. This is particularly exemplified by FIGS. 1 and 3. The apparatus shown in FIG. 1 can be used for example to sear meat. Alternatively, the apparatus shown in FIG. 3 illustrates a similar apparatus to that illustrated by FIGS. 1 and 2 except the height of the air nozzles (6) and lamp housings (5) have been adjusted such that they are each at a similar distance from the conveyor (8). This apparatus can be used, for example, to heat-set the coating of fish fingers.

If the entire surface of the product requires to be exposed to the infra-red heat source but it is not practical for the infra-red heat source to be located around the entire belt there will be a means for turning the food product such that the entire surface is heat treated.

Figure 4:
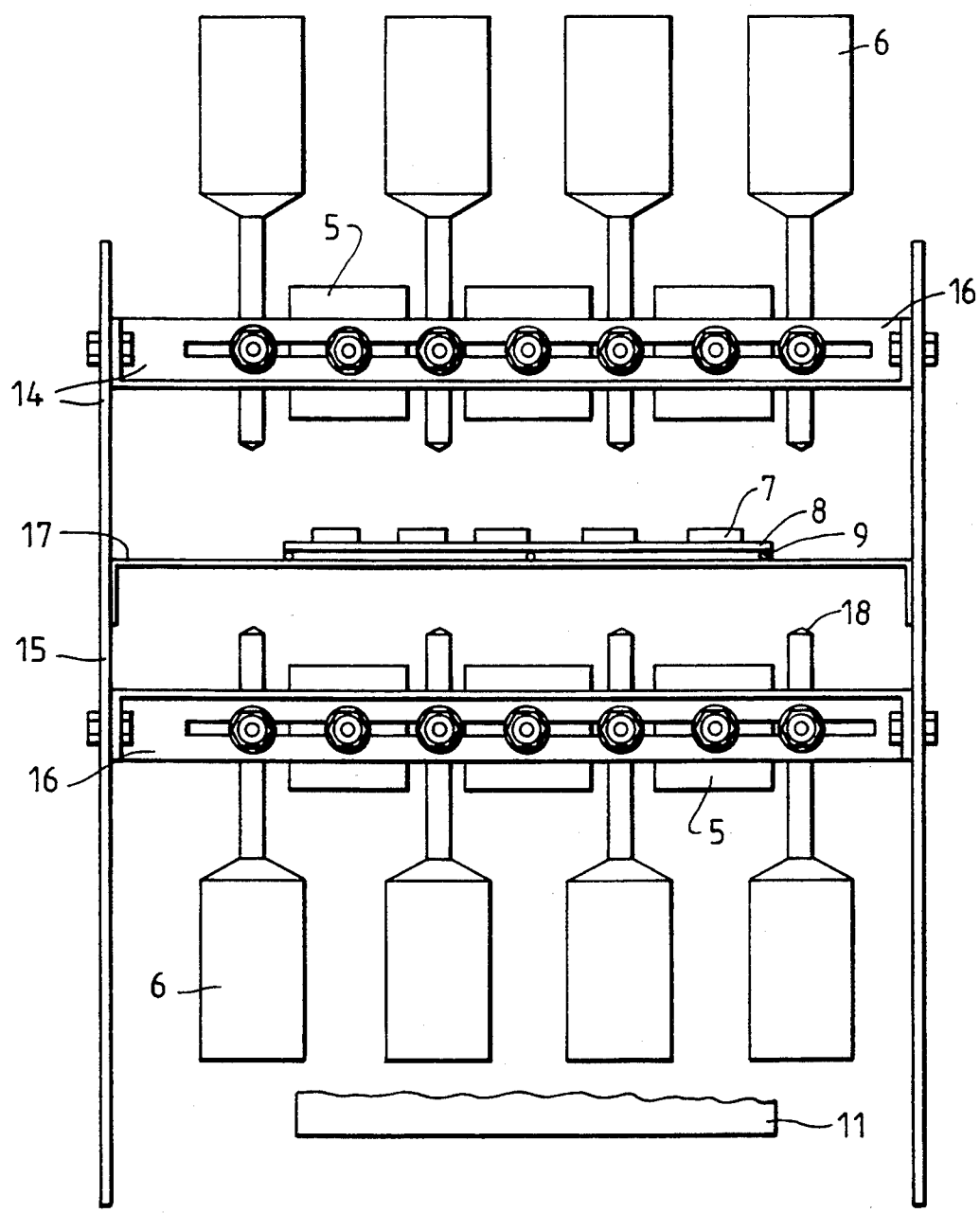
FIG. 4 is a further end elevation similar to FIG. 1 showing a further alternative form of the apparatus.

Alternatively the apparatus as shown in FIG. 4 can be employed in which air nozzles (6) and lamp housings (5) are disposed both above and below the conveyor (8) to expose the food (7) on the conveyor (8) to infra-red radiation from both above and below.

In this apparatus a framework (14) comprising upright supports (15) extending up from a base (not shown) to support upper and lower cross members (16). The food (7) to be treated is carried on the conveyor (8) supported as before on rods (9) upon cross member supports (17). The conveyor is again a heat resistant belt comprising a series of interlinking metal members with air spaces there between. Thus infra-red heat and air from lamps (5) and nozzles (6) respectively, mounted on the lower cross member heat the under surface of the food (7) and infra-red heat and air from lamps (5) and nozzles (6) respectively, mounted on the upper cross member heat the upper surface of the food (7). The return flight of the conveyor belt is indicated at (11).

The speed of the conveyor will determine the length of exposure to the heat source. Preferred exposure times are as follows:

| Coated products | 15–30 seconds |
|---|---|
| Searing of meat products | 20–40 seconds |
| Potato chips | 10–40 seconds |

EXAMPLES

The invention is illustrated with reference to the following examples in accordance with the invention.

Example I—Searing beef joints

The apparatus used is as illustrated by FIGS. 1 and 2 above.

The lamps used were High Density Infra-red Heater lamps (Research Inc, USA, Model 5208). The air nozzles were specially designed in order to provide a fairly uniform air flow across the heated surface.

The product to be processed was a raw joint of beef (e.g. used for roast beef) which was seared over the total surface in two passages.

The first passage seared the joint completely at the top surface and partly at the sides. Afterwards the product was turned around, in order to sear the untreated surface and finishing the partly seared sides.

The distance between lamps and meat was approximately 10 cm in average. The lamps were running at 90% of their maximal power setting (1.8 KW per bulb).

Average exposure time during passage was about 30 seconds (continuous transport). The air temperature was set to 150° C. with an average flow of 5 m/s.

Result: The overall surface of the beef joint was seared within a total process time of 60 seconds resulting in a brown crust. The depth of protein denaturation was between 2 and 5 mm. The meat was still raw beyond that depth.

Example II—Heat setting of coated fishfingers

The lamps used were High Density Infra-red Heater lamps (Research Inc, USA, Model 5208). The air nozzles were specially designed in order to provide a fairly uniform air flow across the heated surface.

The products to be processed were coated fishfingers and similar coated products (coated meat/poultry patties). The operation heat set the coating and established an adhesion between the fish/meat and the coating, with a minimised heating of the fish/meat. The distance between lamps and product was about 15 cm in average. The lamps were running at 50 to 90% of their maximal power setting (1.8 KW per bulb).

Average exposure time was about 20 to 40 seconds (continuous transport).

The air temperature was set to 120° C. with an average flow of 5 m/s.

Result: The coating of the product cooked with a slight browning. Due to the temperature treatment the coating formed a firm structure bonded to the fish/meat surface. The fish/meat was still raw/frozen 2 mm beyond the surface.

Example III; Comparative Example A

The ability for high intensity, short wave infra-red (Example III) and standard infra-red (Comparative Example A) to heat sear steak was studied.

The apparatus used was as illustrated in FIG. 3. The lamps were located 80 mm from the product surface. The product processed was a raw sirloin steak which was seared over the total surface in two passages.

The first passage seared the joint completely at the top surface and partly at the sides. Afterwards the product was turned over in order to sear the untreated surface and finishing the partly seared sides.

The air temperature was approximately 20° C. and had a flow rate of 4100 l l/min. Further information of conditions used and results obtained are shown in Table 1. Surface temperature was measured using thermocouples placed 1 mm underneath the meat surface. The core temperature was also measured using thermocouples.

Results showed that with short wave, high intensity infrared (Example III), the steak was seared to a depth of from 2 to 3 mm, the meat remained raw beyond that depth. With standard infra-red (Comparative Example A) the steak was seared on the surface to a similar extent as seen with Example III, however the meat was cooked throughout.

TABLE I

| Example | Lamp intensity (kW/m²) | Wavelength 9μm) | Exposure time/passage (sec) | Surface temp (°C.) | Core temp (°C.) after searing |
|---|---|---|---|---|---|
| III | 400 | 1.17 | 18 | 113 | 19 |
| A | 50 | 2 | 60 | 104 | 58 |

Example IV; Comparative Example B

The ability for high intensity, short wave infra-red (Example IV) and standard infra-red (Comparative Example B) to heat set the coating of a fish finger was studied.

The apparatus used was as illustrated in FIG. 3. The lamps were located 45 mm from the product surface. The product processed was a frozen fish finger which was heatset over the total coating in two passages.

The air temperature was approximately 20° C. and had a flow rate of 4100 l l/min.

Further information of conditions used and results obtained are shown in Table 2. Surface temperature was measured using thermocouples placed within the coating of the fish finger. The core temperature of the fish finger was also measured using thermocouples both before and after exposure to infra-red.

Results showed that with short wave high intensity infrared (Example IV), the fish finger coating only was set, the fish core was not cooked and remained substantially frozen. With standard infra-red (Comparative Example B) the fish coating was set. However the fish core was also defrosted and partially cooked.

TABLE 2

| Example | Lamp intensity (kW/m²) | Wavelength (μm) | Exposure time/passage (sec) | Surface temp (°C.) | Core temp before infra-red (°C.) | Core temp after infra-red (°C.) |
|---|---|---|---|---|---|---|
| IV | 175 | 1.34 | 20 | 160 | −6.5 | −1 to −3 |
| B | 50 | 2 | 40 | 120 | −6.5 | 9 |

We claim:

1. A process for the rapid total surface heating of a food product comprising exposing the food product to an infra-red heat source having an intensity of from 100 kW/m² to 1000 kW/m² and a wavelength of from 0.8 μm to 2.5 μm.

2. A process according to claim 1 wherein the infra-red heat source has a wavelength of from 1.1 μm to 1.6 μm.

3. A process according to claim 1 wherein the infra-red heat source has a intensity of from 1.50 kW/m² to 500 kW/m².

4. A process according to claim 1 wherein the food product is exposed to the infra-red heat source for from 2 seconds to 100 seconds.

5. A process according to claim 1 wherein the food product is exposed to the infra-red heat source for from 5 seconds to 90 seconds.

6. A process according to claim 1 wherein the food product is exposed to the infra-red heat source for from 10 seconds to 50 seconds.

7. A process according to claim 1 wherein the food product is additionally exposed to an air source.

8. A process according to claim 1 wherein the process additionally includes applying from 0.1 to 4% by weight of the food product oil to the surface of the food product either before or after heating the surface of the food product using high intensity short wave infra-red.

9. A process according to claim 8 wherein the oil is applied to the food product surface via spraying.

10. A process according to claim 8 wherein the oil is applied to the food product surface via incorporation into a coating composition for coating the outer surface of the food product.

11. A process according to claim 1 wherein the food product being heat treated is selected from the group consisting of coated products and vegetables.

* * * * *